United States Patent [19]

Asahina et al.

[11] Patent Number: 5,107,528
[45] Date of Patent: Apr. 21, 1992

[54] X-RAY DIAGNOSIS APPARATUS

[75] Inventors: Hiroshi Asahina, Tochigi; Hitoshi Fujita, Ootawara, both of Japan

[73] Assignee: Kabushiki Kaisha Toshiba, Kawasaki, Japan

[21] Appl. No.: 611,295

[22] Filed: Nov. 9, 1990

[30] Foreign Application Priority Data

Nov. 13, 1989 [JP] Japan ................................ 1-292154

[51] Int. Cl.⁵ .............................................. H05G 1/64
[52] U.S. Cl. ........................................ 378/99; 378/41; 378/62; 358/111
[58] Field of Search ....................... 378/99, 98, 41, 62; 358/111

[56] References Cited

U.S. PATENT DOCUMENTS

| | | | |
|---|---|---|---|
| 4,413,352 | 11/1983 | Nishio | 378/41 |
| 4,819,255 | 4/1989 | Sato | 378/99 |
| 4,905,264 | 2/1990 | Ogura | 378/99 |
| 4,991,192 | 2/1991 | Nishiki | 378/99 |

Primary Examiner—Janice A. Howell
Assistant Examiner—David P. Porta
Attorney, Agent, or Firm—Oblon, Spivak, McClelland, Maier & Neustadt

[57] ABSTRACT

An X-ray diagnosis apparatus comprises an X-ray source for obtaining images of an object by means of cine-fluorographic image pickup and TV image pickup, first and second X-ray image pickup systems comprising image intensifiers, TV cameras, cine-fluorographic movie cameras, etc., a single image processing system for subjecting TV images obtained by the first and second X-ray image pickup systems to image processing, a buffer system, disposed between one of the X-ray image pickup systems and the image processing system, for buffering the image transmitted from this one of the X-ray image pickup systems to the image processing system, and a display system for displaying the image processed by the image processing system. In this apparatus, images from the first and second X-ray image pickup systems can be sequentially delivered to the single image processing system in a time-divisional manner.

17 Claims, 19 Drawing Sheets

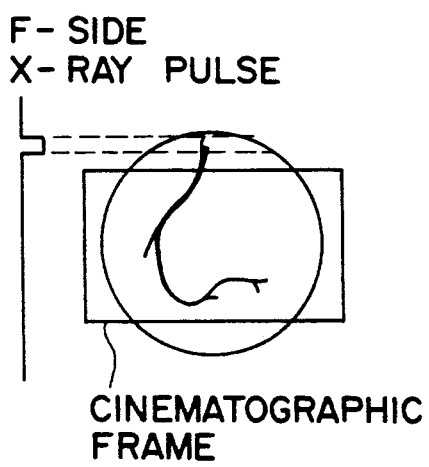 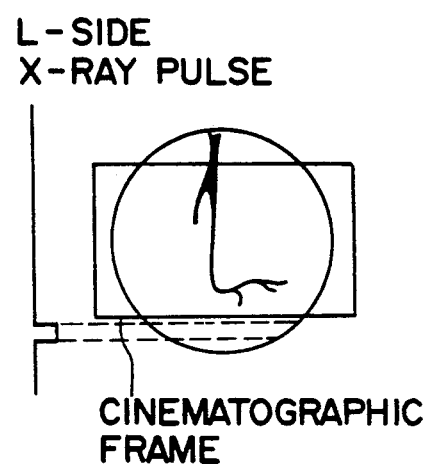
F I G. 5A  F I G. 5B

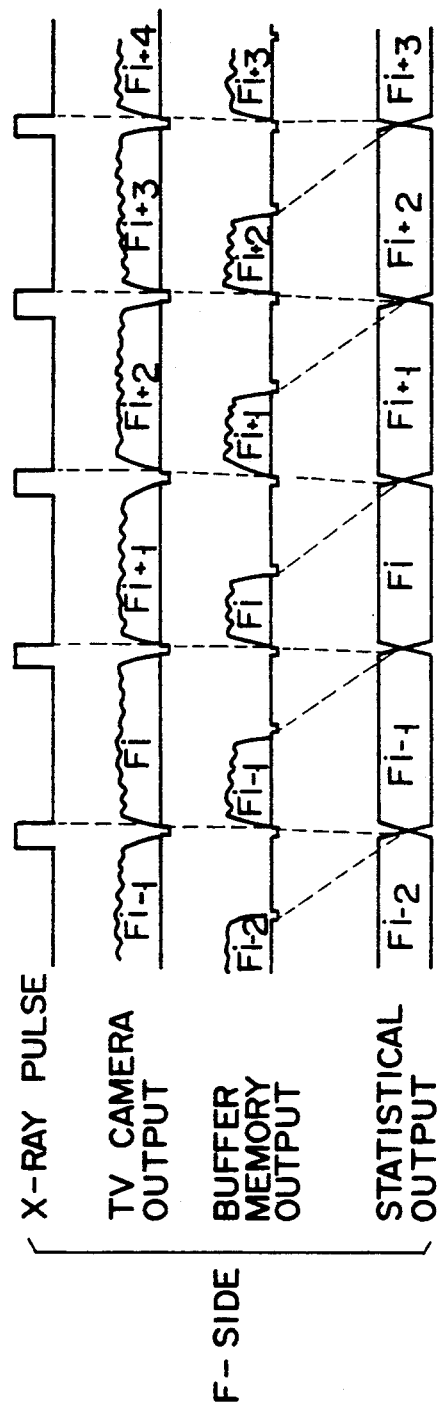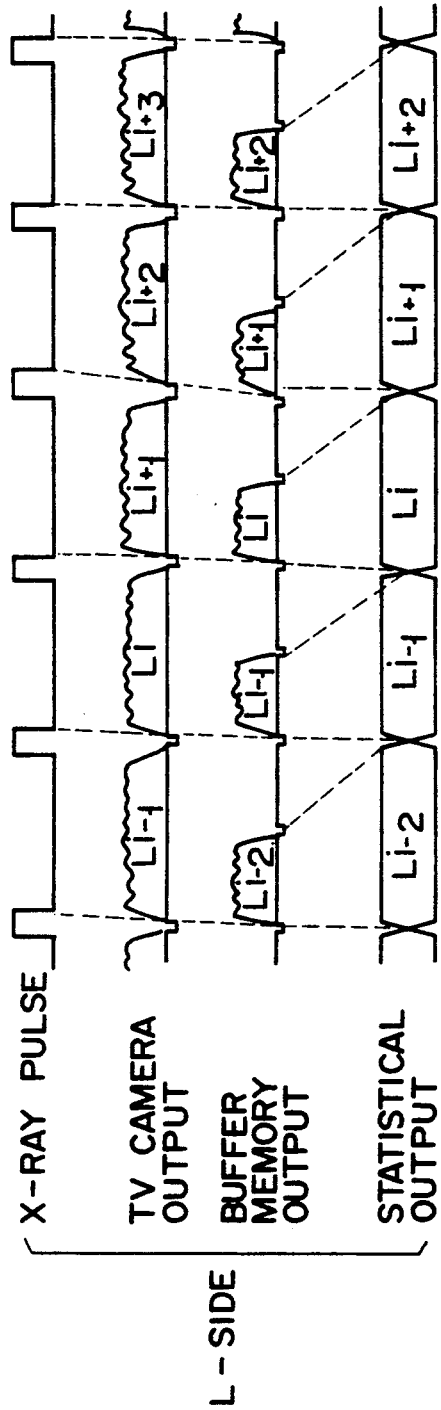

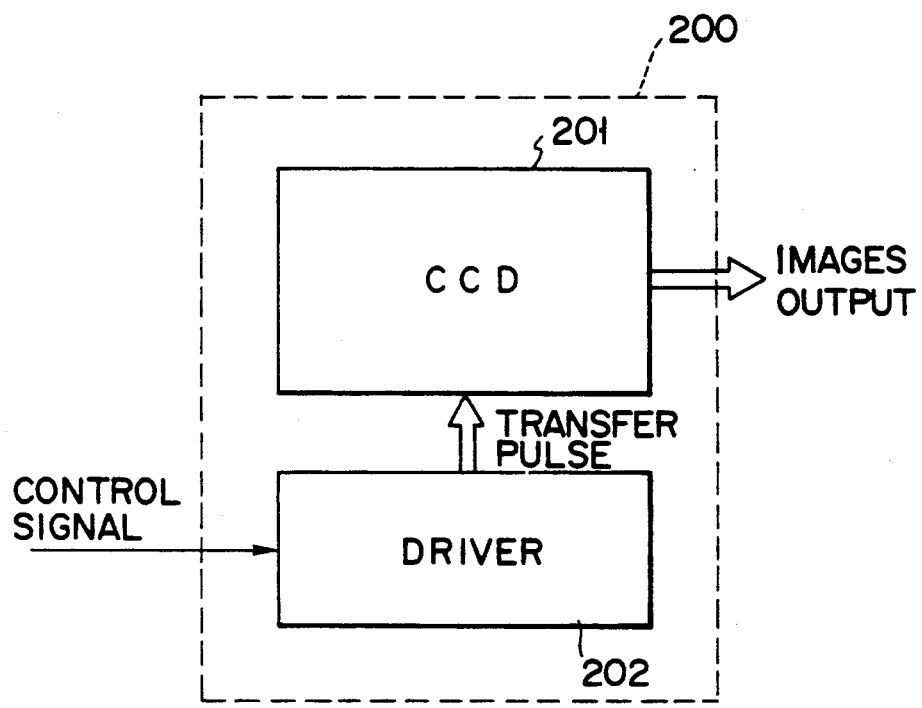
F I G. 12

X-RAY DIAGNOSIS APPARATUS

Background of the Invention

1. Field of the Invention

The present invention relates to an X-ray diagnosis apparatus for radiating X-rays on an object, thereby obtaining a cine-fluorographic image by means of a cinefluorographic movie camera and/or TV image by means of a TV camera, and processing the obtained image for diagnosis.

2. Description of the Related Art

X-ray cine-fluorography is generally used for angiocardiography. X-ray cine-fluorography, however, is a film photographing technique, and immediate reproduction of images is not possible. Thus, the X-ray cine-fluorography is not suitable for early diagnosis. Under the situation, an X-ray cine-fluorographical system may be combined with an X-ray TV system. According to this combined system, an image obtained by X-ray cine-fluorography is recorded by a video cassette recorder (VCR). Thus, the image can be reproduced and observed immediately after image pickup. In other words, this combined system realizes real-time diagnosis.

In the above-mentioned X-ray TV system, images are normally read out by interlaced scan with 60 fields/sec. On the other hand, in the X-ray cine-fluorographic system, the number of times of X-ray radiation is generally 30/sec. in synchronism with the TV scan timing. With this number of times of X-ray radiation, however, a luminance difference occurs between a field image obtained just after X-ray radiation and the next field image. In order to solve this problem, there has been proposed a system wherein a high-luminance image is recorded on a digital image memory and a recorded image is repeatedly output by two fields, thereby eliminating flickering.

In this type of apparatus, however, since the field image is output two times, the vertical resolution is reduced to 50%. Because of this undesirable resolution, suitable diagnosis cannot be expected. In addition, there has been proposed a an apparatus wherein a TV camera is driven in a non-interlaced scan mode, and the obtained image is recorded on a digital memory and is read out in an interlaced scan mode. According to this apparatus, all image data on one screen is sequentially read out by a single X-ray radiation, and no luminance difference occurs and suitable diagnosis can be carried out.

On the other hand, in the angiocardiography, two-directional simultaneous image pickup is performed in many cases. According to the simultaneous image pickup, x rays are radiated alternately on the frontal side and lateral side of an object. In the angiocardiography, an image free from luminance difference can be observed by use of non-interfaced/interlaced converters. However, if recording apparatuses are provided on the frontal side of the object, expensive memory devices must be used and the scale of the circuit increases. Under the situation, images from two TV cameras are alternately input to a single digital fluorography (DF) apparatus and are recorded in a memory and read out for observation. In the case where biplane images are input to a single DF apparatus, if the TV cameras are driven in the non-interlaced scan mode to acquire images, two TV cameras must be operated synchronously. Thus, if the X-ray radiation on the frontal side of the object is started at the time just prior to the image read start, the X-ray radiation on the lateral side is started during the image readout. As a result, while the frontal side is normal, as shown in FIG. 1A, a time error appears between the upper and lower parts of the lateral image, as shown in FIG. 1B, with a boundary being located at a scan point corresponding to the X-ray radiation timing. Consequently, a false image including a displaced image component due to a strip-like noise is produced, and suitable diagnosis cannot be expected.

SUMMARY OF THE INVENTION

The object of the present invention is to provide an X-ray diagnosis apparatus for detecting an X-ray image by means of cine-fluorography and TV image pickup, processing the obtained image and displaying the processed image with high accuracy.

According to an aspect of the invention, there is provided an X-ray diagnosis apparatus comprising:

first and second X-ray image pickup means for converting X-rays, which have passed through an object, to optical images, thereby performing cine-fluorography with use of cine-fluorographic movie cameras and video imaging with use of TV cameras;

an image processing system including a digital image processing means for subjecting TV images obtained by the first and second X-ray image pickup means to digital image processing;

buffer means, provided between one of said X-ray image pickup means and the digital image processing means, for buffering images delivered from said one of the X-ray image pickup means to the digital image processing means; and display means for displaying images processed by said image processing system.

According to another aspect of the invention, there is provided an X-ray diagnosis apparatus comprising:

a first X-ray generating means and/or a second X-ray generating means for radiating X-rays to an object in one direction and/or in two directions;

a first X-ray detecting means and/or a second X-ray detecting means for converting X-rays, which have passed cine-fluorography with use of cine-fluorographic movie cameras and video imaging with use of TV cameras;

an image processing system for subjecting TV images obtained by the first and/or second X-ray detecting means to image processing;

display means for displaying images processed by said image processing system; and control means for controlling the frame-feeding of the cine-fluorographic movie camera of the first and/or second X-ray detecting means, and controlling the X-ray radiation timing of the first and/or X-ray generating means.

According to another aspect of the invention, there is provided an X-ray diagnosis apparatus comprising:

first and second X-ray generating means for radiating X-rays to an object in two directions;

first and second X-ray image pickup means for converting the X-rays, which have passed through the object, to optical images and video-imaging the optical images by means of TV cameras;

an image processing system inclluding single image processing means for subjecting TV images obtained by the first and second X-ray image pickup means to image processing;

first and second buffer means arranged in parallel on transmission lines for connecting the first and second X-ray image pickup means to the image processing system, said buffer means buffering the images transmitted from the first and second X-ray image pickup means to the image processing system; and display means for displaying the images processed by the image processing system.

According to another aspect of the invention, there is provided an X-ray diagnosis apparatus comprising:

first and second X-ray image pickup means for converting X-rays, which have passed through an object, to optical images and video-imaging the optical images by means of TV cameras;

an image processing system for subjecting TV images obtained by the first and second X-ray image pickup means to image processing;

first and second buffer means arranged, respectively, between the first X-ray image pickup means and the image processing means and between the second X-ray image pickup means and the image processing means, said buffer means buffering the images transmitted from the first and second X-ray image pickup means to the image processing system; and first and second statistical processing means, arranged in parallel to the first and second buffer means, for receiving images delivered from the first and second X-ray image pickup means; and display means for displaying the images processed by the image processing system.

According to another aspect of the invention, there is provided an X-ray diagnosis apparatus comprising:

first and second X-ray generating means for radiating X-rays to an object in two directions;

first and second X-ray detecting means for converting the X-rays, which have passed through the object, to optical images and video-imaging the optical images by means of TV cameras employing CCD (change cupled device) image sensor-type image pickup devices;

image processing means for subjecting TV images obtained by the first and second X-ray image pickup means to image processing;

display means for displaying the images processed by the image processing means; and timing control means for controlling the timing at which X-rays are generated by the first and second X-ray generating means, and the timing at which shift pulses are delivered to the CCD image sensor-type image pickup devices in the first and second X-ray detecting means.

According to another aspect of the invention, there is provided an X-ray diagnosis apparatus comprising:

X-ray generating means including a stereo X-ray tube for radiating X-rays to an object;

X-ray detecting means for converting the X-rays, which have passed through the object, to optical images and video-imaging the optical images by means of TV cameras employing CCD image sensor-type image pickup devices;

image processing means for subjecting TV images obtained by the X-ray image pickup means to image processing;

display means for displaying the images processed by the image processing means; and timing control means for controlling the timing at which left side and right side X-rays are generated by the stereo X-ray tube of the X-ray generating means, and the timing at which shift pulses are delivered to the CCD image sensor-type image pickup devices in the X-ray detecting means.

According to another aspect of the invention, there is provided an X-ray diagnosis apparatus comprising:

first and second X-ray generating means including a stereo X-ray tube for radiating X-rays to an object in two directions;

first and second X-ray detecting means for converting the X-rays, which have passed through the object, to optical images and video-imaging the optical images by means of TV cameras employing CCD image sensor-type image pickup devices;

image processing means for subjecting TV images obtained by the first and second X-ray image pickup means to image processing;

display means for displaying the images processed by the image processing means; and timing control means for controlling the timing at which left side and right side X-rays are generated by the stereo X-ray tube of the first and second X-ray generating means, and the timing at which shift pulses are delivered to the CCD image sensor-type image pickup devices in the first and second X-ray detecting means.

According to another aspect of the invention, there is provided an X-ray diagnosis apparatus comprising:

X-ray generating means for radiating X-rays to an object;

X-ray detecting means for converting X-rays, which have passed through the object, to optical images, thereby performing cine-fluorography with use of cine-fluorographic movie cameras and video imaging with use of TV cameras comprising CCD image sensor-type image pickup devices;

image processing means for subjecting TV images obtained by the X-ray detecting means to image processing;

display means for displaying images processed by said image processing means;

X-ray control means for controlling the timing at which said X-ray generating means radiates X-rays and the timing at which shutter pulses are delivered to the cine-fluorographic movie camera of the X-ray detecting means; and timing control means for controlling the timing at which the shutter pulses are delivered to the cine-fluorographic movie camera of the X-ray detecting means, and the timing at which shift pulses are delivered to the CCD image sensor-type image pickup devices of the X-ray detecting means.

According to another aspect of the invention, there is provided an X-ray diagnosis apparatus comprising:

first and second X-ray generating means for radiating X-rays to an object in two directions;

first and second X-ray detecting means for converting X-rays, which have passed through the object, to optical images, thereby performing cine-fluorography with use of cine-fluorographic movie cameras and video imaging with use of TV cameras comprising CCD image sensor-type image pickup devices;

image processing means for subjecting TV images obtained by the first and second X-ray detecting means to image processing;

display means for displaying images processed by said image processing means;

X-ray control means for controlling the timing at which said first and second X-ray generating means radiates X-rays and the timing at which shutter pulses are delivered to the cine-fluorographic movie camera of the first and second X-ray detecting means; and timing control means for controlling the timing at which the shutter pulses are delivered to the cine-fluorographic movie camera of the first and second X-ray detecting means, and the timing at which shift pulses are delivered to the CCD image sensor-type image pickup devices of the first and second X-ray detecting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5A and FIG. 5B are views for illustrating the operation of the second embodiment;

FIG. 10A and FIG. 10B are views for illustrating the operation of the fourth embodiment;

FIG. 12 is a block diagram showing an example of a CCD image sensor employed in the fifth embodiment;

DETAILED DESCRIPTION OF THE PREFERRED EMBODIMENTS

Figure 1A:
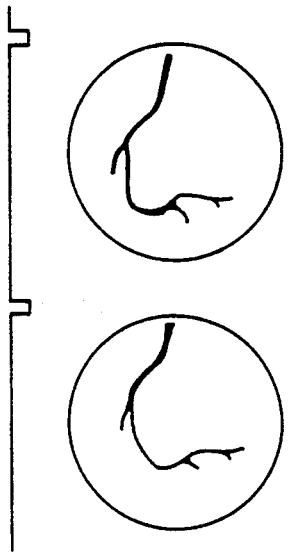
FIGS. 1A and 1B are views for illustrating a problem of a conventional X-ray diagnosis apparatus.
Figure 1B:
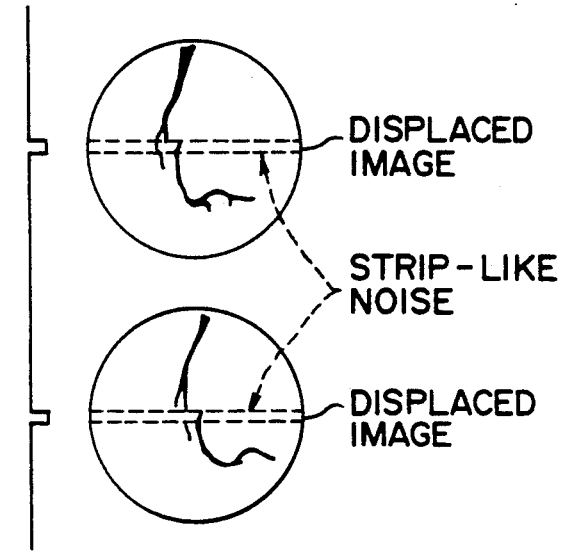
Figure 2:
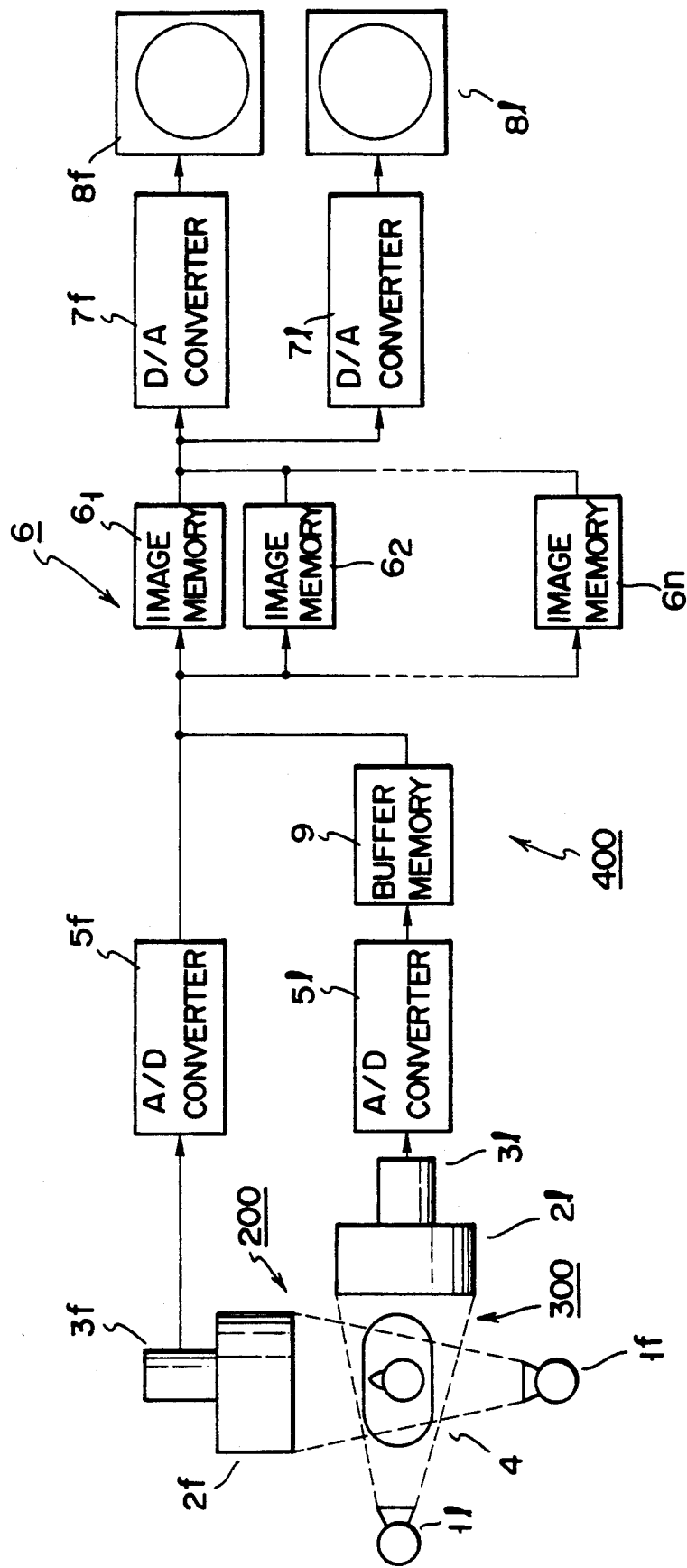
FIG. 2 is a block diagram showing an X-ray diagnosis apparatus according to a first embodiment of the present invention.

An X-ray diagnosis apparatus according to a first embodiment will now be described with reference tb FIGS. 2 and 3. FIG. 2 is a block diagram showing a structure of the X-ray diagnosis apparatus of the first embodiment.

The X-ray diagnosis apparatus of the first embodiment comprises an frontal side X-ray image pickup (f-side) 200, an lateral side X-ray image pickup (l-side) 300, an image display system 400 and a control system (not shown) for generating X-rays. The f-side 200 comprises an X-ray tube $1f$, an image intensifier (I.I.) $2f$, an optical system (not shown) and a TV camera $3f$ and, where necessary, a cine-fluorographic movie camera (not shown). The l-side 300 comprises an X-ray tube $1l$, an image intensifier (I.I.) $2l$, and optical system (not shown) annd a TV camera 31 and, where necessary cine-fluorographic movie camera (not shown). Regarding the reference numerals, "f" denotes "frontal", and "l" denotes "lateral."

A TV image or a cine-fluorographic image of an object 4 is obtained by the f-side X-ray image pickup system 200 and the l-side X-ray image pickup system 300. Electric image signals output from the TV cameras are supplied to the image display system 400. In the display system 400, the image signals are digitized by A/D converters $5f$ and $5l$. The digital signals are fed to image memories 6 ($6_1, 6_2 ... 6_n$) which are mail parts of a digital fluorographic apparatus serving as a digital image processing system. The digital signals fetched from the memories 6 are converted to analog signals by D/A converters $7f$ and $7l$ and are displayed on TV monitors $8f$ and $8l$.

In the above structure, X-rays radiated by the f-side X-ray tube $1f$ pass through the object 4 and enter the I.I. $2f$. In the I.I. $2f$, the X-rays are X-ray/light converted to an optical image. The optical image is picked up by the TV camera $3f$. The TV camera $3f$ outputs a video signal, which is in turn converted to a digital signal by the A/D converter $5f$. The digital signal is stored in the image memory $6_f$ as an f-side image signal.

X-rays radiated by the l-side X-ray tube $1l$ pass through the object 4 and enter the I.I. $2l$. In the I.I. $2l$, the X-rays are X-ray/light converted to an optical image. The optical image is picked up by the TV camera $3l$. The TV camera $3l$ outputs a video signal, which is in turn converted to a digital signal by the A/D converter $5l$. The digital signal is stored in the image memory $6_2$ as an l-side image signal.

The f-side image signal and the l-side image signal are read out from the image memories $6_1$ and $6_2$. Then, the image signals are converted to video signals by the D/A converters $7f$ and $7l$ and images are displayed on the TV monitors $8f$ and $8l$ for diagnosis.

The above-described structure is a commonly employed one. This embodiment has the following novel structural feature. That is, a buffer memory 9 for buffering the l-side image is provided in the real stage of the A/D converter $5l$.

Figure 3:
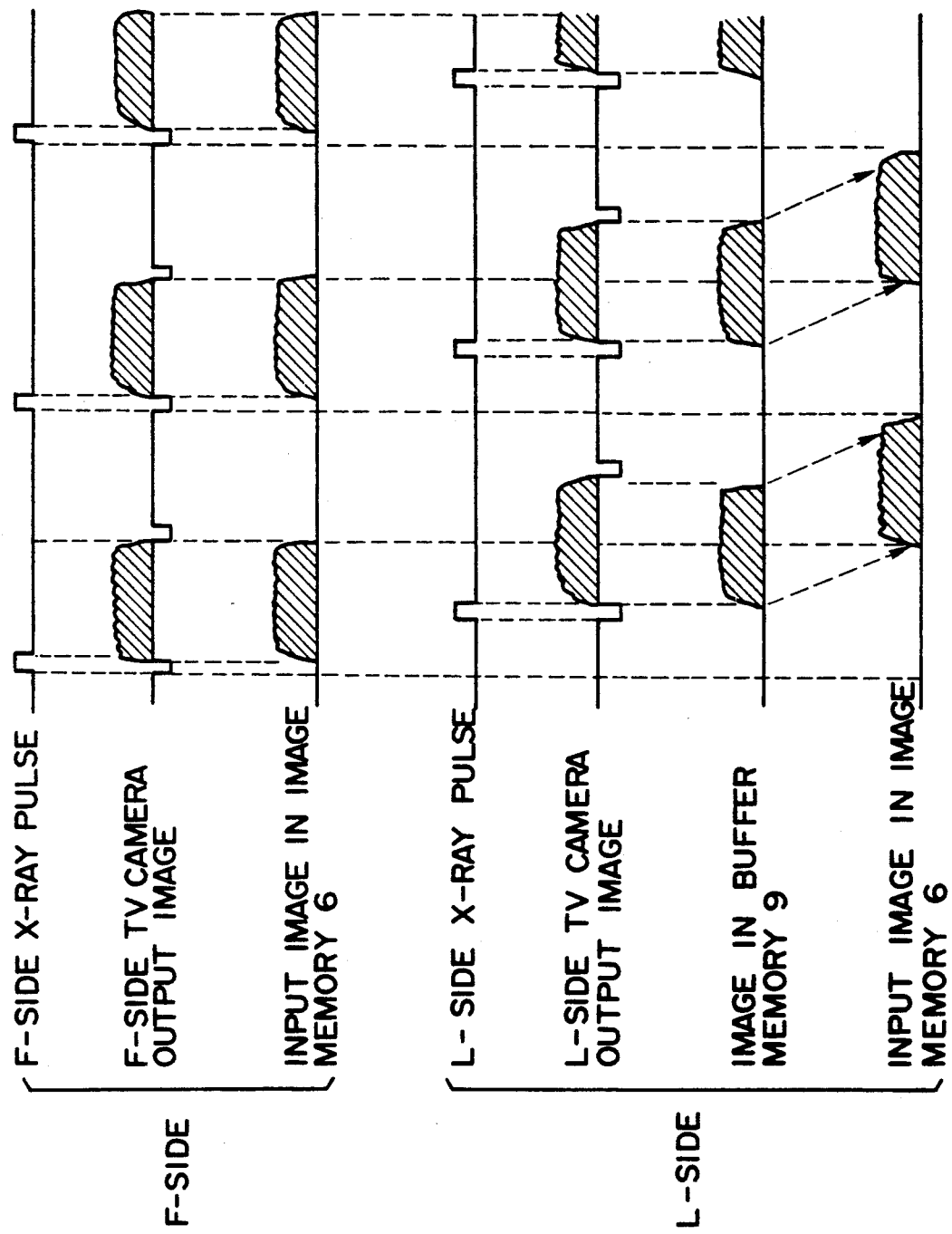
FIG. 3 is a view for illustrating the operation of the first embodiment.

The video signal from the TV camera $3f$ is digitized by the A/D converter $5f$, as shown in FIG. 2, and the resultant digital signal is stored in the image memory $6_1$ at the timing of the first frame shown in FIG. 3. The video signal from the TV camera $3l$ is digitized by the A/D converter $5l$ and the digital signal is stored in the image memory 9. This digital signal is read out sequentially from the upper left pixel at the timing of the second frame and then is stored in the image memory $6_2$. This process is repeated and the f-side and l-side images are normally observed.

As stated above, when the radiation timing of X-ray pulses of one of the f-side X-ray image pickup system and the l-side X-ray image pickup system is made to coincide with the blanking timing of both TV cameras 3f and 3l, it is not possible that X-ray pulses are radiated simultaneously from both X-ray image pickup systems. As a result, the image reading timings corresponding to the X-ray pulses from both the other X-ray image pickup systems are partially overlapped with the other. Thus, in the prior art, it is necessary to provide two digital image processing systems and to transmit the images from both the X-ray image pickup systems to the two digital image processing systems.

By contrast, in the present embodiment, synchronizing timings for pickuping the X-ray images are shifted to 180° phase with each other, and the image output from one of the X-ray image pickup systems is input to one digital image processing system via the buffer memory 9 with a time lag. Thus, the images from the two X-ray image pickup systems can be sequentially sent to the single digital image processing system in a time-divisional manner.

This embodiment has the following advantage. The TV images obtained by the two X-ray image pickup systems can be image-processed to produce images free from strip-like noise and a false image can be obtained, only by providing the relatively inexpensive buffer memory 9, without providing a relatively expensive digital image processing system.

Figure 4:
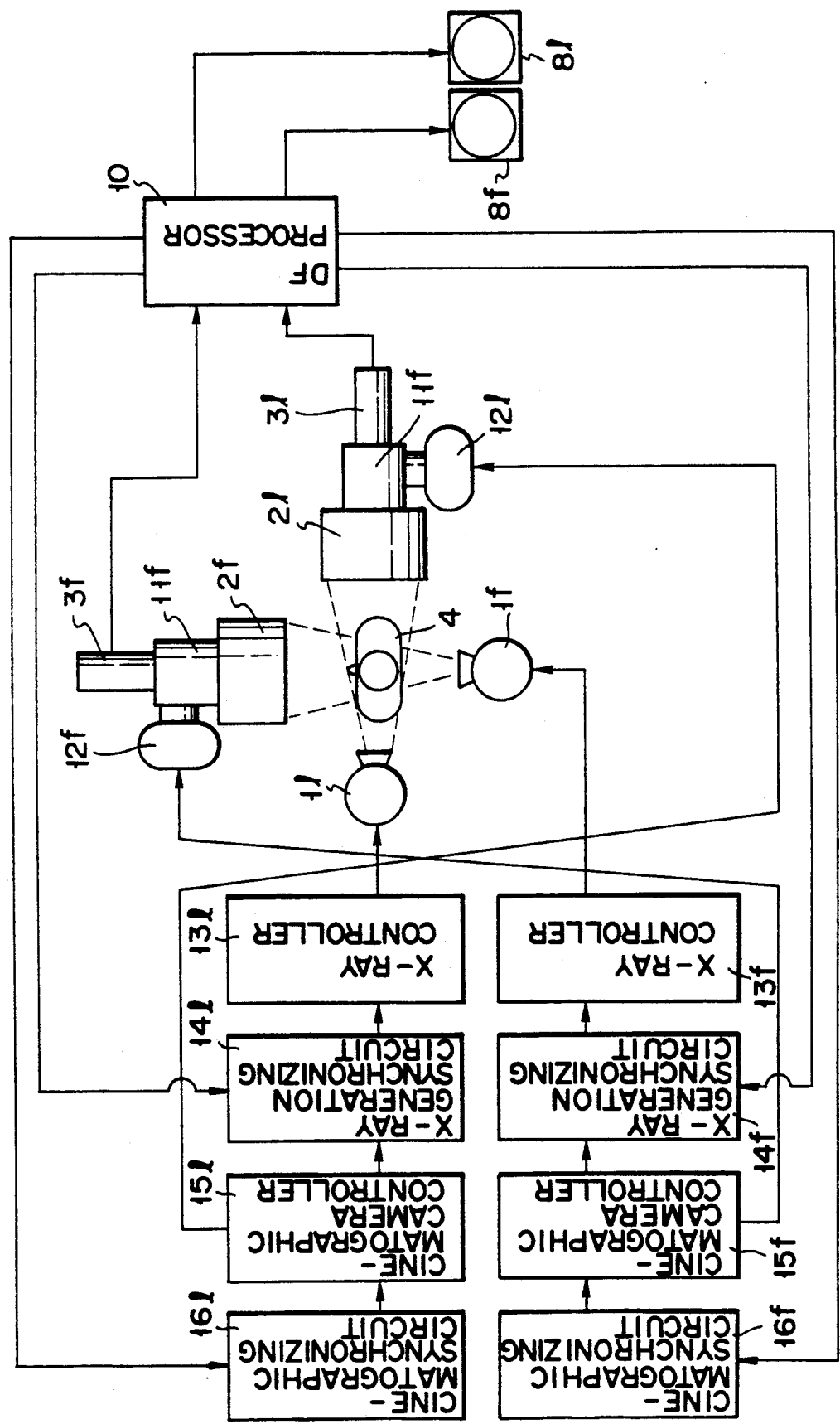
FIG. 4 is a block diagram showing an X-ray diagnosis apparatus according to a second embodiment of the invention.

An X-ray diagnosis apparatus according to a second embodiment of the present invention will now be described with reference to FIGS. 4 and 5. FIG. 4 is a block diagram showing the second embodiment, and FIG. 5 is a view for illustrating the operation of the second embodiment.

In the embodiment shown in FIG. 4, the A/D converters 5f and 5l, image memories 6 ($6_1$, $6_2$ and $6_3$) and D/A converters 7f and 7l are included in a digital fluorography (DF) processor 10. This embodiment is provided with cine-fluorographic cameras 12f and 12l. The l-side X-ray image pickup system includes an X-ray controller 13l, an X-ray generation synchronizing circuit 14l, a cine-fluorographic camera controller 15l, and a cine-fluorographic camera synchronizing circuit 16l. On the other hand, the f-side X-ray image pickup system includes an X-ray controller 13f, an X-ray generation synchronizing circuit 14f, a cine-fluorographic camera controller 15f, and a cine-fluorographic camera synchronizing circuit 16f.

The apparatus of the second embodiment has two X-ray image pickup systems comprising the TV cameras 3l and 3f and cine-fluorographic cameras 12l and 12f. For example, in the l-side X-ray image pickup system, the timing of the frame feeding of the cine-fluorographic camera 12l and the timing of the X-ray radiation can be controlled by the X-ray controller 13l, X-ray generation synchronizing circuit 14l, cine-fluorographic camera controller 15l, and a cine-fluorographic camera synchronizing circuit 16l. Thus, an error between the image acquisition timing of the f-side TV camera and the X-ray pulse radiation timing of the X-ray image pickup system can be corrected, and jitter of the cine-fluorographic camera 12l can be prevented.

Thus, an image free from strip-like noise can be obtained.

In the single-plane cine-fluorographic image pickup and TV image pick, the X-ray pulse radiation timing of the X-ray image pickup system can be set by the above-described timing control in a time range outside the range in which an effective image is processed. Thus, as is shown in FIGS. 5A and 5B, in the bi-plane cinefluorographic image pickup and TV image pickup, the X-ray pulse radiation timing of the z-ray image pickup system is set outside the cine-fluorographic frame, thereby locating a displaced image component at the corner of the screen. Therefore, an image substantially free from a displaced image component can be obtained.

According to the apparatus of the second embodiment, the bi-plane or single-plane cine-fluorographic image pickup and TV image pickup are carried out, and the picked-up images are processed by the single digital image processing system, thereby displaying a high-precision image.

An X-ray diagnosis apparatus according to a third embodiment of the invention will now be described with reference to FIG. 6. The apparatus of the third embodiment includes a novel image processing system (digital fluorography apparatus) 60.

The image processing system 60 comprises a buffer memory 61f for buffering an output from the f-side TV camera 3f and a buffer memory 61l for buffering an output from the l-side TV camera 3l.

The system 60 further comprises an image processing circuit for processing the output from the f-side TV camera 3f and the output from the l-side TV camera 3l, an image memory 6 for storing images, a statistical processing circuit 63 for obtaining statistical information, and display processing circuits 64f and 64l for individually processing the output from the f-side TV camera 3f processed by the image processing circuit 62 and the output from the l-side TV camera 3l processed by the image processing circuit 62. The statistical processing circuit 63 analyzes the digital form image according to a predetermined method, thereby obtaining statistical information. The statistical information is supplied to X-ray controllers 13f and 13l. The X-ray controllers 13f and 13l determines the X-ray image pickup condition and the X-ray radiation condition.

The display processing circuits 64f and 64l of the image processing system 60 output images and the output images are displayed on the monitors 8f and 8l.

The statistical processing circuit 63 delivers a command based on the X-ray radiation condition to the f-side X-ray controller 13f, and a command based on the X-ray radiation condition to the l-side X-ray controller 13l.

Figure 6:
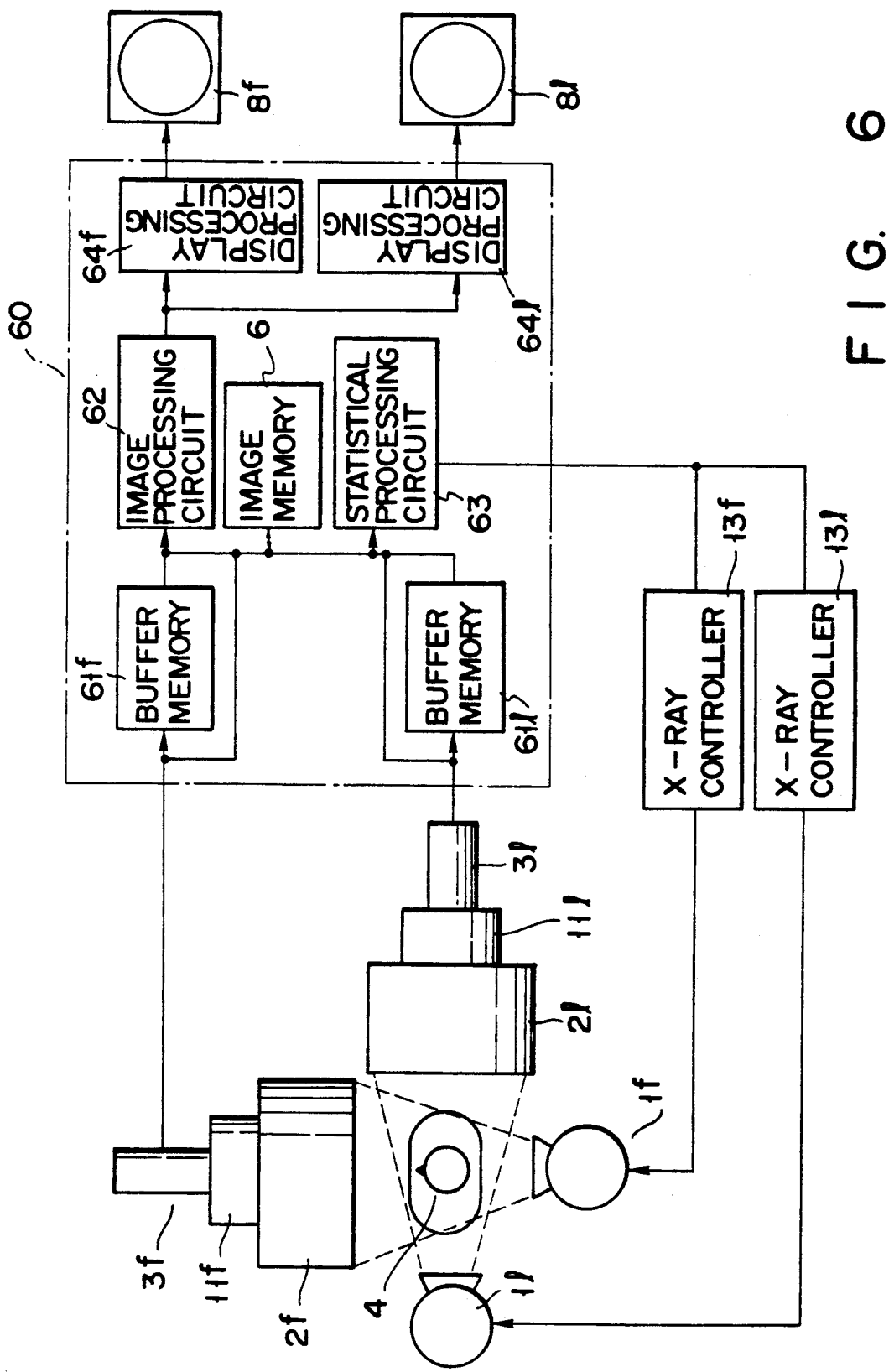
FIG. 6 is a block diagram showing an X-ray diagnosis apparatus according to a third embodiment of the invention.
Figure 7:
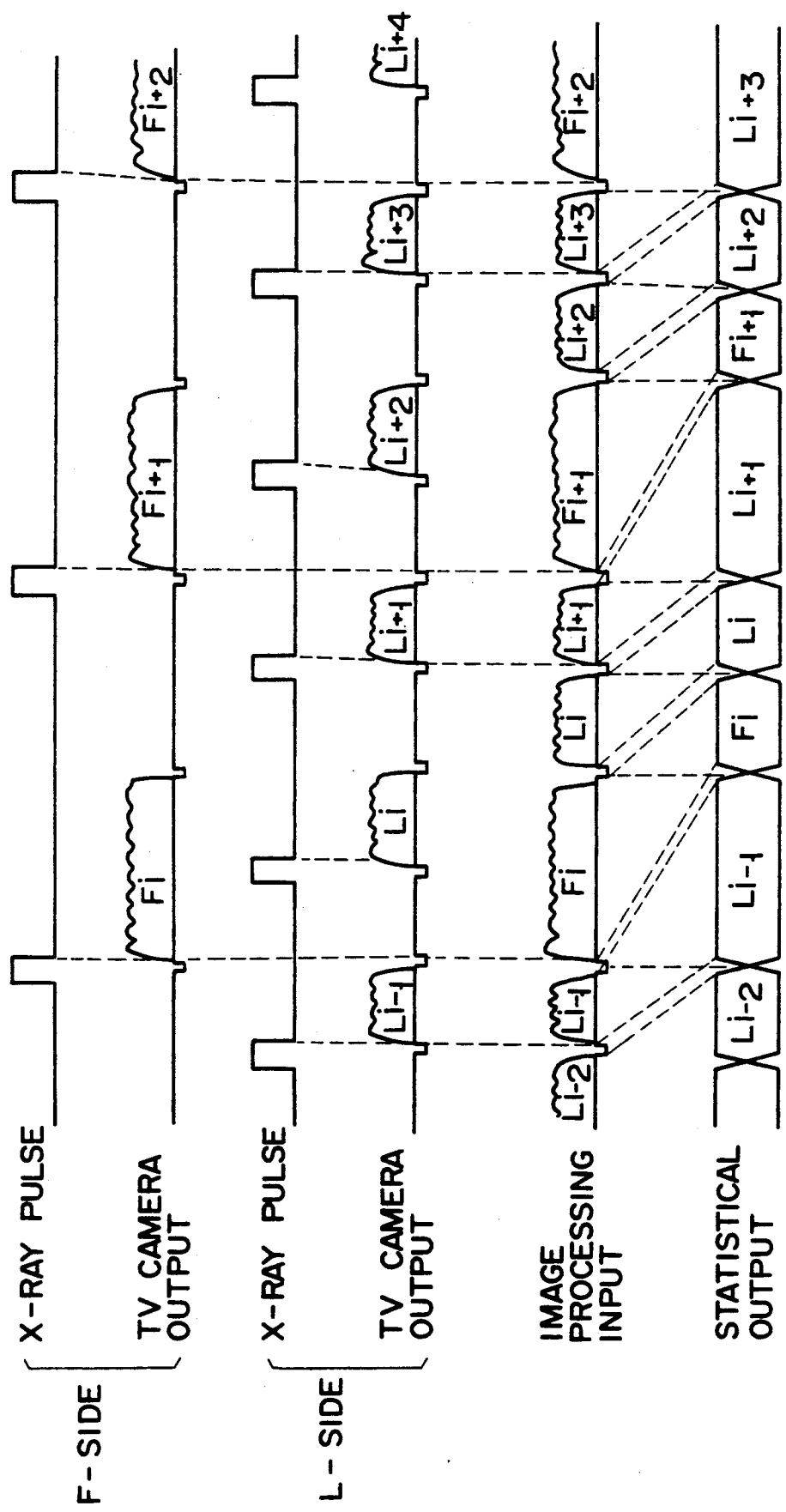
FIG. 7 is a timing chart for illustrating an example of the operation of the third embodiment.

The X-ray diagnosis apparatus shown in FIG. 6 operates according to the timing chart of FIG. 7. The l-side X-ray image pickup system has a video speed corresponding to double the video speed of the f-side X-ray image pickup system.

In the f-side X-ray image pickup system, an X-ray pulse is radiated at every second frame, thereby producing an image signal. The image signal output from the TV camera 3f of the f-side X-ray image pickup system is transferred to and processed by the image processing circuit 62, without being temporarily stored in the buffer memory 61f. Simultaneously, the image signal is transferred to the statistical processing circuit 63 and statistical information is acquired in the next frame.

The l-side operates at a video speed corresponding to double the video speed of the f-side. In the l-side, an X-ray pulse is radiated at every second frame thereby producing an image signal. If the image signal output from the l-side TV camera 3*l* is transferred to the image processing circuit 62 without being temporarily stored in the buffer memory 61*l*, the transfer of the image overlaps at the timing Li, Li+2,....

In order to avoid this problem, the image at the timing Li, Li+2... is temporarily stored in the buffer memory 61*l* and is read out in the next frame. As a result, the overlap of image does not caused even when the image at the timing Li+1, Li+3 ... is transferred to the image processing circuit 62 without being temporarily stored in the buffer memory 61*l*.

Thus, only the single image processing circuit 62 may be used to process images obtained by two systems having different video speeds, even where high-speed image processing is required.

In this embodiment, statistical information of not only the f-side but also the l-side can be obtained. Specifically, the statistical information of the images at the timing Li and Li+2, which are temporarily stored in the buffer memory 61*l*, are obtained with a time lag of 1 frame.

Figure 8:
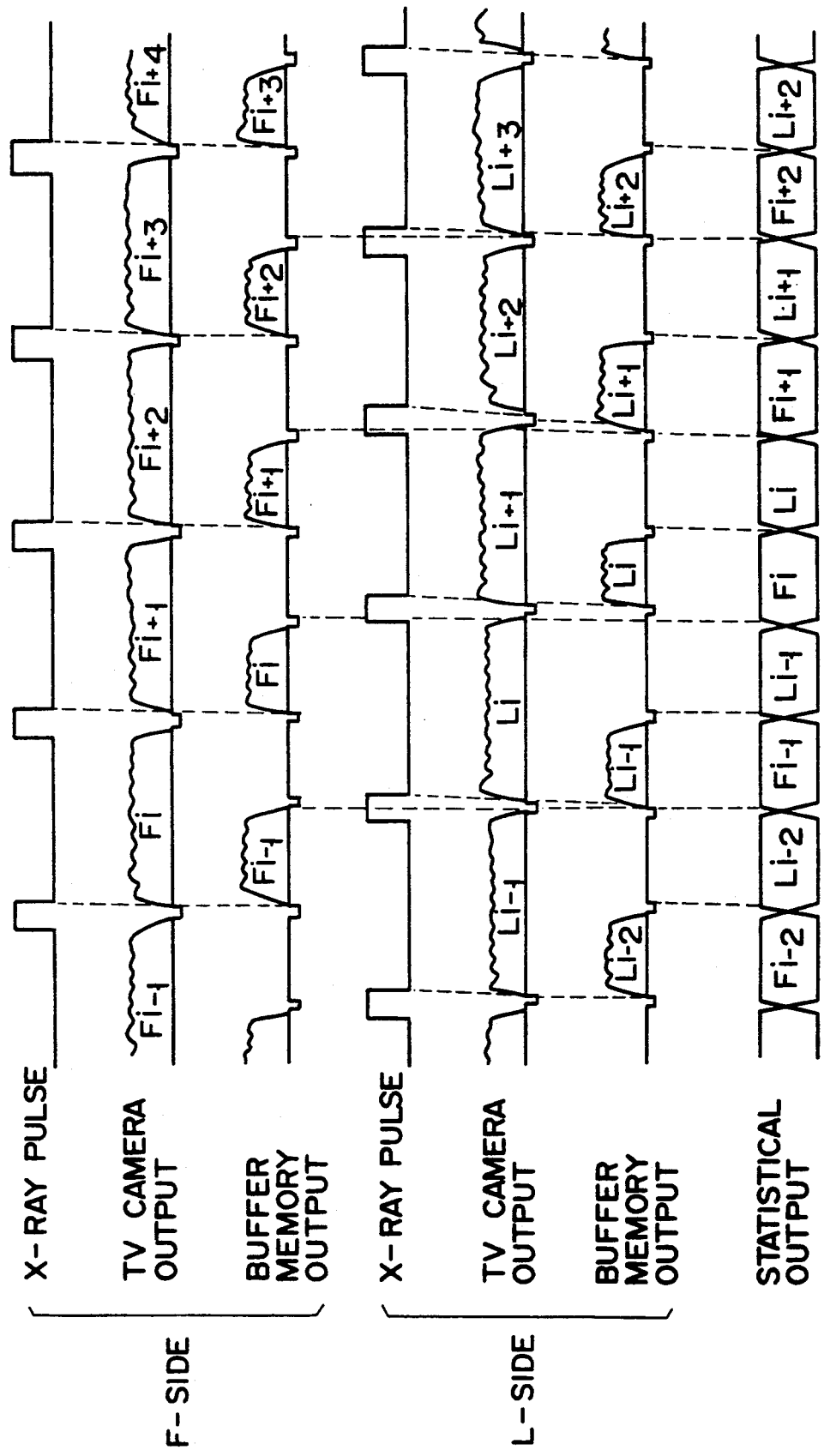
FIG. 8 is a timing chart for illustrating another example of the operation of the third embodiment.

Referring to FIG. 8, the operation of the hardware structure shown in FIG. 6 will now be described. In this operation, where the image storage/processing speed of the image processing system 60 is double the video speed, the image pickup of the f-side X-ray image pickup system/l-side X-ray image pickup system can be performed at the video speed of the f-side X-ray image pickup system/l-side X-ray image pickup system. Specifically, both the f-side X-ray image pickup system and the l-side X-ray image pickup system are synchronized with the frames to radiate X-rays, thereby producing image signals. The image signals output from the TV cameras 3*f* and 3*l* are temporarily stored in the buffer memories 61*f* and 61*l*. The image signals stored in the buffer memories 61*f* and 61*l* are read out at a speed corresponding to double the video speed, and input to the image processing circuit 62, image memory 6 and statistical processing circuit 63.

The images acquired by the f-side X-ray image pickup system and l-side X-ray image pickup system are processed by the image processing circuit 62 in accordance with the respective video speeds. The processed images are supplied to the display processing circuits 64*f* and 64*l* and then displayed on the TV monitors 8*f* and 8*l*. In addition, since the images acquired by the f-side and l-side systems are stored in the image memory 6 and input to the statistical processing circuit 63, statistical information can be acquired. In this embodiment, the statistical information is acquired with a time lag of a ½ frame.

Figure 9:
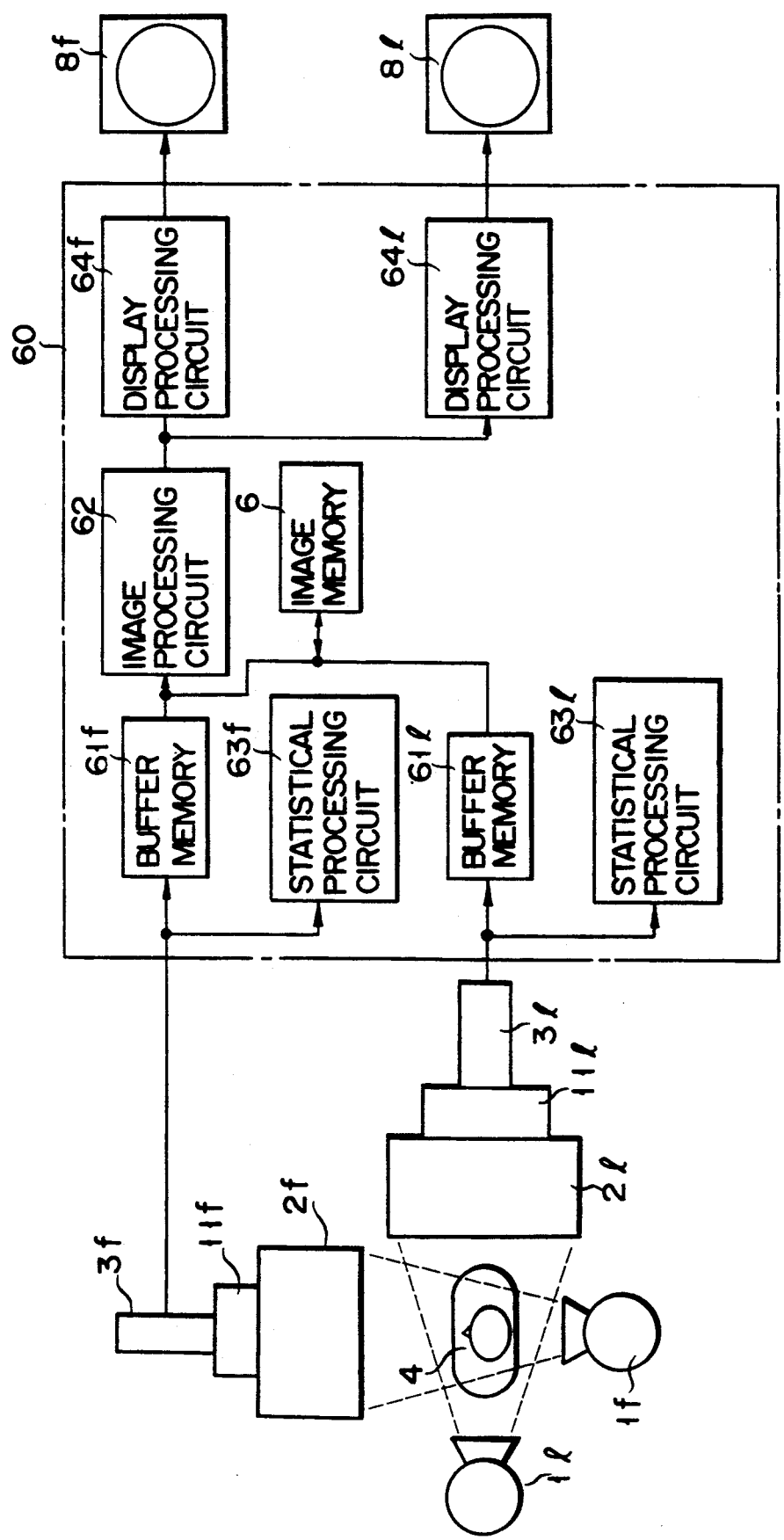
FIG. 9 is a block diagram showing an X-ray diagnosis apparatus according to a fourth embodiment of the invention.

An X-ray diagnosis apparatus according to a fourth embodiment of the invention will now be described with reference to FIGS. 9, 10A and 10B. According to the fourth embodiment, images can be obtained with no time lag. The structure shown in FIG. 9 differs from that shown in FIG. 6, in that statistical processing circuits 63*f* and 63*l* are added. Images acquired by the f-side and l-side X-ray image pickup systems are input simultaneously to the buffer memories 61*f* and 61*l* and statistical processing circuits 63*f* and 63*l*.

According to the fourth embodiment, as is shown in FIGS. 10A and 10B, both the f-side and l-side X-ray image pickup systems radiate X-ray pulses in synchronism with frames, thereby producing images. The images output from the TV cameras 3*f* and 3*l* are temporarily stored in the buffer memories 61*f* and 61*l* and are input to the statistical processing circuits 63*f* and 63*l*. Thus, statistical information for the f-side and l-side X-ray image pickup systems can be acquired individually in the subsequent frame. The time lag for the acquisition of statistical information can be limited to a time corresponding to one frame.

Figure 11:
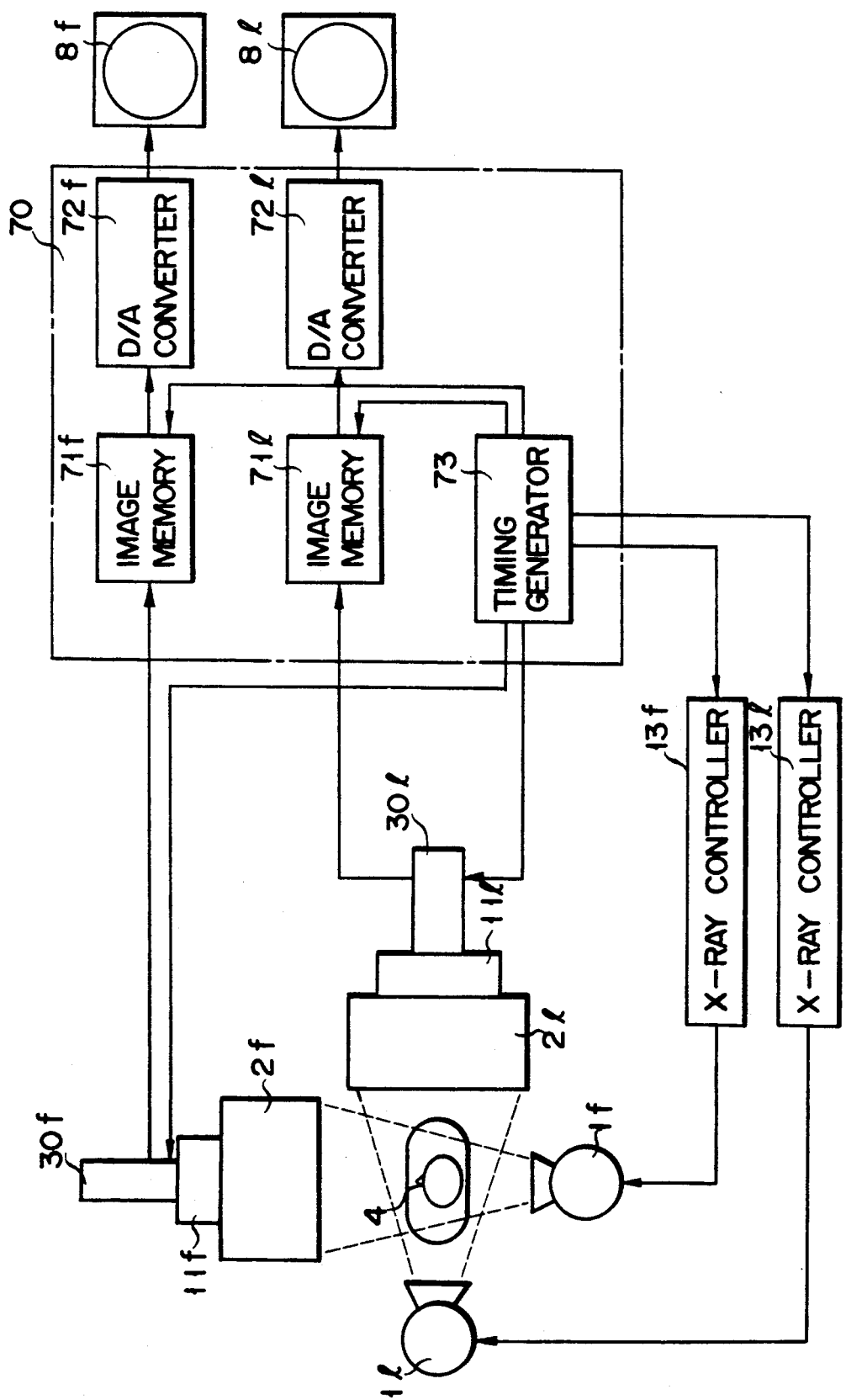
FIG. 11 is a block diagram showing an X-ray diagnosis apparatus according to a fifth embodiment of the invention.

An X-ray diagnosis apparatus according to a fifth embodiment of the invention will now be described with reference to FIG. 11. The apparatus of the fifth embodiment employs TV cameras comprising CCD (charge coupled device) image sensor-type image pickup devices. Specifically, in the fifth embodiment, TV cameras 30*f* and 30*l* comprising CCD image sensor-type image pickup devices are used as f-side and l-side TV cameras. This apparatus comprises an image processing system 70 having a timing generator 73 for synchronously controlling the TV cameras 30*f* and 30*l* and X-ray controllers 13*f* and 13*l*. The image processing system 70 includes at least image memories 71*f* and 71*l*, D/A converters 72*f* and 72*l* and timing generator 73.

The timing generator 73 delivers shift pulses for shifting images from an accumulation layer to a transfer layer to the CCD image sensor-type image pickup devices of the TV cameras 30*f* and 30*l*, and also delivers radiation timing commands to the X-ray tubes 1*f* and 1*l* according to predetermined X-ray conditions.

FIG. 12 is a block diagram showing schematically the structure of the CCD image sensor-type image pickup device. The CCD image sensor-type image pickup device 200 comprises a CCD 201 and a driver 202. A control signal is applied to the driver 202. The control signal includes the aforementioned shift pulses for shifting images from the accumulation layer to the transfer layer, and reset pulses (described later).

Figure 13:
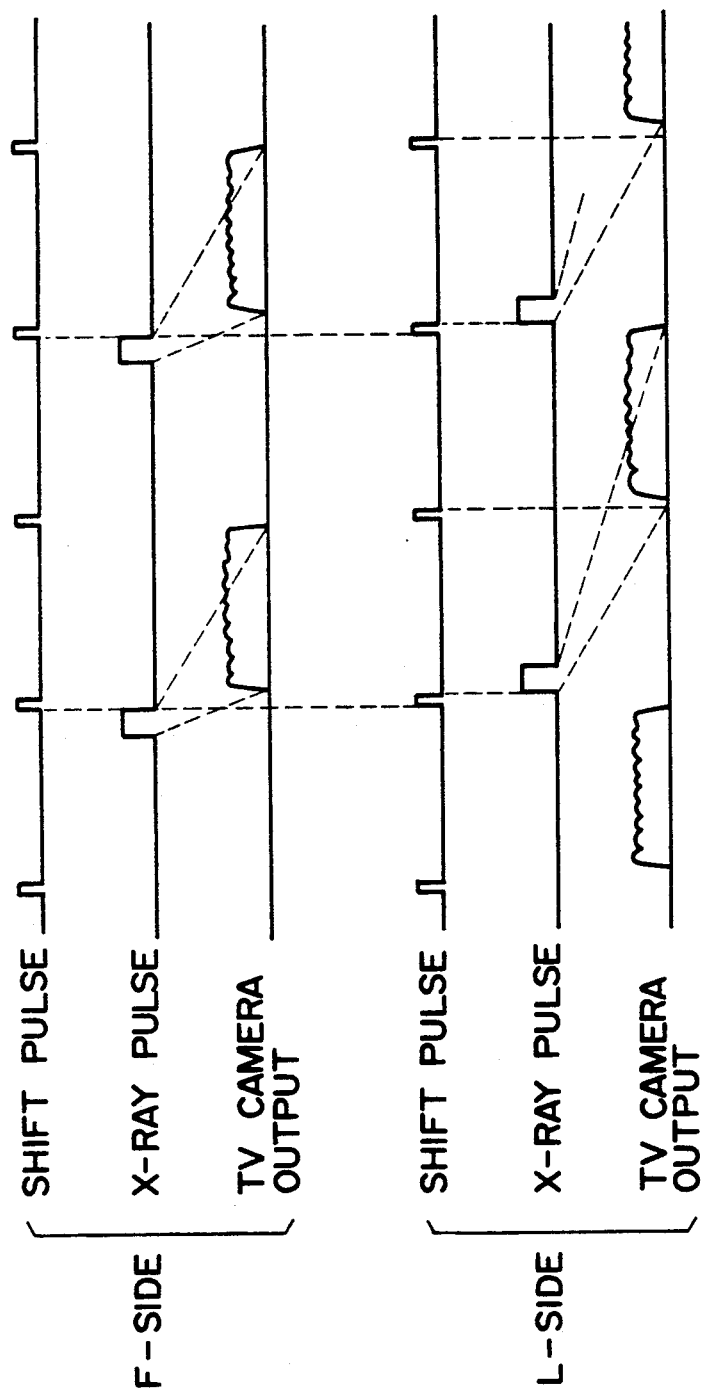
FIG. 13 is a timing chart for illustrating the operation of the fifth embodiment.

FIG. 13 is a timing chart showing the relationship between the shift pulses from the timing generator 73, the f-side and l-side X-ray radiation, and the outputs from the TV cameras 30*f* and 30*l*. This timing chart illustrates the operation of the apparatus shown in FIG. 11. As is shown in FIG. 13, the shift pulses are delivered from the timing generator 73 to the f-side and l-side TV cameras 30*f* and 30*l* at the timing other than the effective image timing, as has been stated in relation to FIG. 4. By virtue of the shift pulse, the f-side X-ray pulse starts to rise before the time corresponding to the width of the X-ray pulse and falls prior to the rise of the shift pulse. On the other hand, the l-side X-ray pulse starts to rise upon the falling of the shift pulse and falls after the time corresponding to the width of the X-ray pulse has passed.

By this embodiment, the interval of the f-side and l-side X-ray pulse can be reduced to the shift pulse time.

In this embodiment, the X-ray pulse includes a wave tail. The wave tail is caused mainly by the charged capacitance in cables coupling high-voltage generators of the X-ray controllers 13*f* and 13*l* and the X-ray tubes 1*f* and 1*l*. Thus, the wave tail is caused when the application of high voltage to the X-ray tubes is finished.

When the f-side and l-side X-ray pulse interval is set to the width of the shift pulse, an X-ray image due to the wave tail of the f-side X-ray pulse may enter the l-side image.

To solve this problem, the tube voltage and tube current values generated by the high-voltage generator are input to the timing generator 73, and the time the wave tail is substantially finished is calculated. Based on the calculated time, the generation timing of the f-side X-ray pulse is accelerated.

By this method, the X-ray image due to the wave tail of the f-side (or l-side) X-ray pulse is prevented from entering the l-side (or f-side) image. Since the f-side and l-side bi-plane images can be obtained with no time lag, this embodiment is suitable for observation and analysis, in particular, for observation of a blood flow image.

Figure 14:
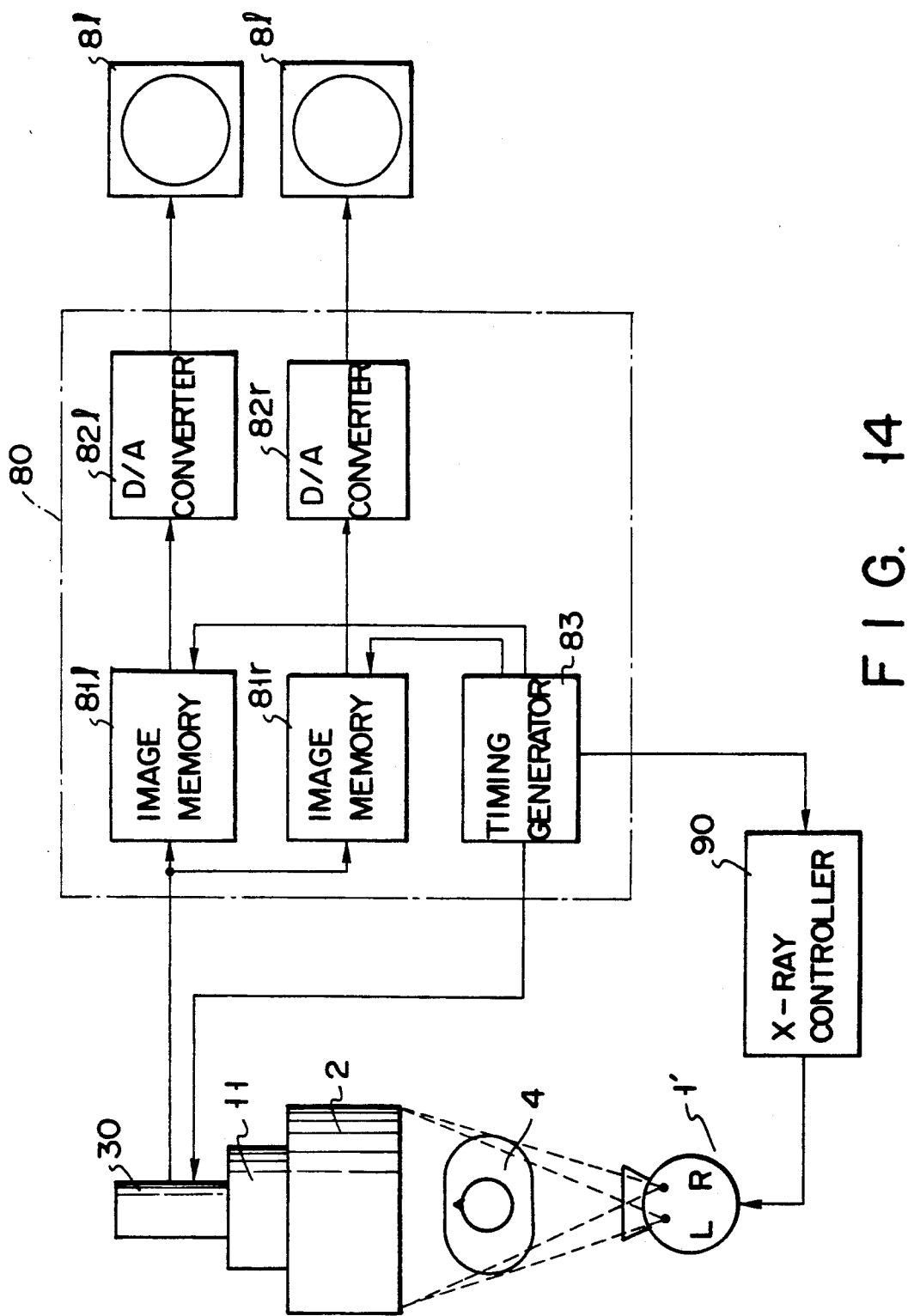
FIG. 14 is a block diagram showing an X-ray diagnosis apparatus according to a sixth embodiment of the invention.

An X-ray diagnosis apparatus according to a sixth embodiment of the invention will now be described with reference to FIG. 14.

The apparatus of the sixth embodiment is designed for stereo image pickup. In the block diagram of FIG. 14, symbol "L" ("l") denotes the left focus of stereo X-ray tube 1', and "R" ("r") denotes the right focus. As in the above-described embodiment, the sixth embodiment employs TV camera 30 comprising a CCD image sensor-type image pickup device. An image processing system 80 comprises an L-side image memory 81$l$, a R-side image memory 81$r$, an L-side D/A converter 82$l$, a R-side D/A converter 82$r$, and a timing generator 83. The timing generator 83 controls an X-ray controller 90 for controlling the L-focus X-ray radiation and R-focus X-ray radiation of the stereo X-ray tube 1', and the TV camera 30. As in the above-described manner, the timing generator 83 delivers shift pulses to the TV camera 30 in accordance with the L/R-focus radiation.

Figure 15:
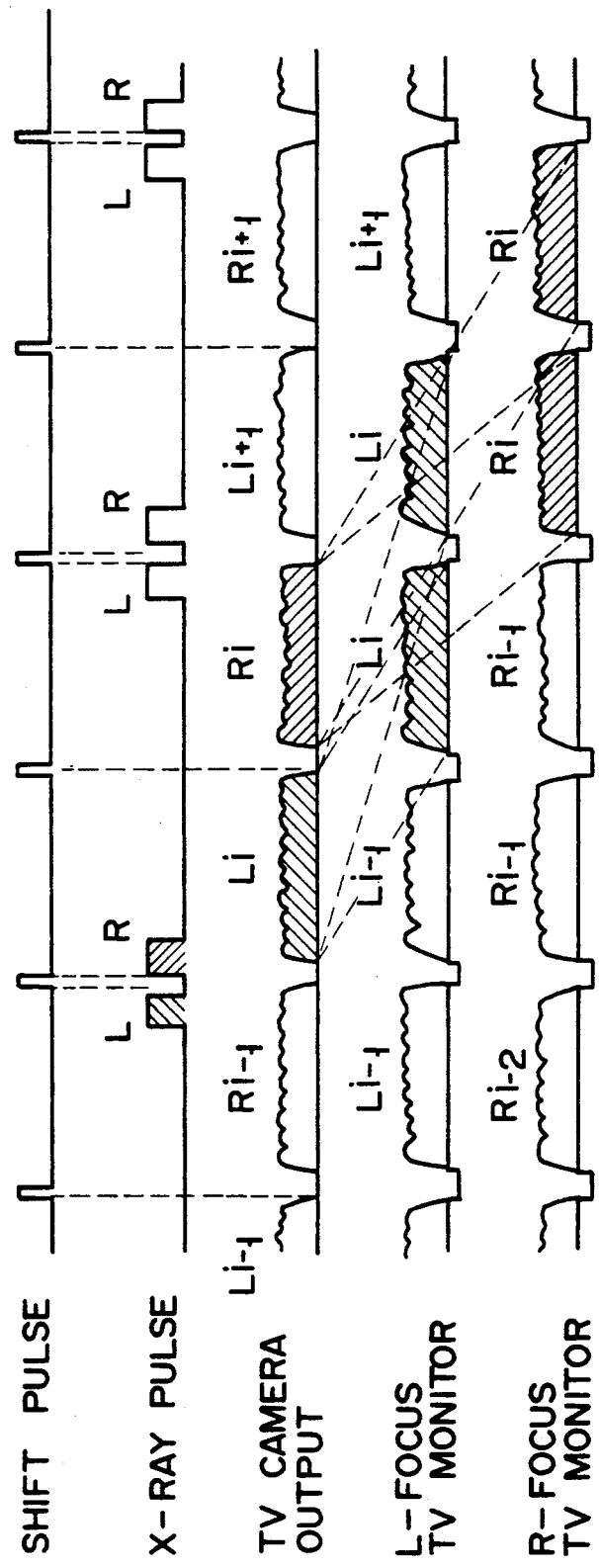
FIG. 15 is a view for illustrating the operation of the sixth embodiment.

The operation of the apparatus shown in FIG. 14 will now be described with reference to FIG. 15. The shift pulses delivered to the TV camera 30 are generated at the time other than the time effective images are processed. By virtue of the shift pulse, the L-focus X-ray pulse rises prior to the time corresponding to the X-ray pulse width and falls before the shift pulse rises. The R-focus X-ray pulse rises upon the falling of the shift pulse and falls after the time corresponding to the X-ray pulse width has passed.

By this embodiment, the L/R-focus X-ray pulse interval can be reduced to the shift pulse time. In this embodiment, the X-ray pulse includes a wave tail. The wave tail is caused mainly by the charged capacitance in cables coupling high-voltage generators of the X-ray controller 90 and the X-ray tube 1'. Thus, the wave tail is caused when the application of high voltage to the X-ray tube is finished.

When the r-side and l-side X-ray pulse interval is set to the width of the shift pulse, an X-ray image due to the wave tail of the l-side X-ray pulse may enter the r-side image.

To solve this problem, the tube voltage and tube current values generated by the high-voltage generator are input to the timing generator 83, and the time the wave tail is substantially finished is calculated. Based on the calculated time, the generation timing of the l-side X-ray pulse is brought forward. Since the L-side and R-side stereoscopic images can be obtained with no time lag, this embodiment is suitable for stereoscopic observation and analysis, in particular, for observation of a blood flow image.

Figure 19:
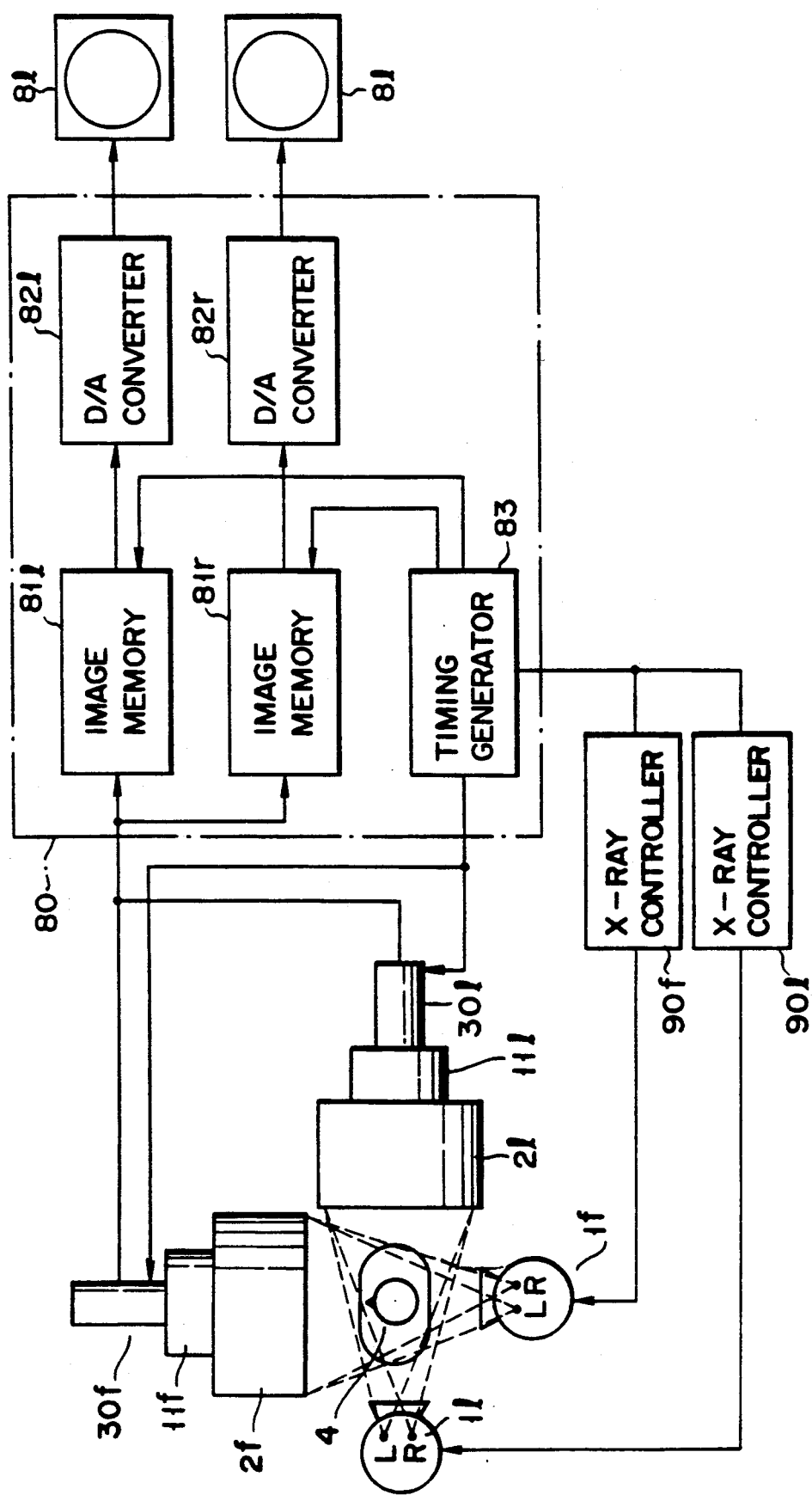

As shown in FIG. 19, the apparatus of the sixth embodiment of the X-ray diagnosis apparatus may also comprise a set of imaging devices, each of which include a TV camera 30$f$, 30$l$ comprising a CCD image sensor-type image pick-up device, a stereo X-ray device 1$f$, 1$l$, image processing system 80 and a TV monitor. The X-ray diagnosis apparatus according to this embodiment includes a timing generator 833 for controlling TV cameras 30$f$, 30$l$ and X-ray controllers 90$f$, 90$l$. Accordingly, similar to the embodiments shown inn FIGS. 4, 6, 9 and 11 which include two imaging systems, the number of imaging systems in this embodiment utilizing stereo X-ray tubes is not limited to one imaging system, and may comprise two imaging systems.

Figure 16:
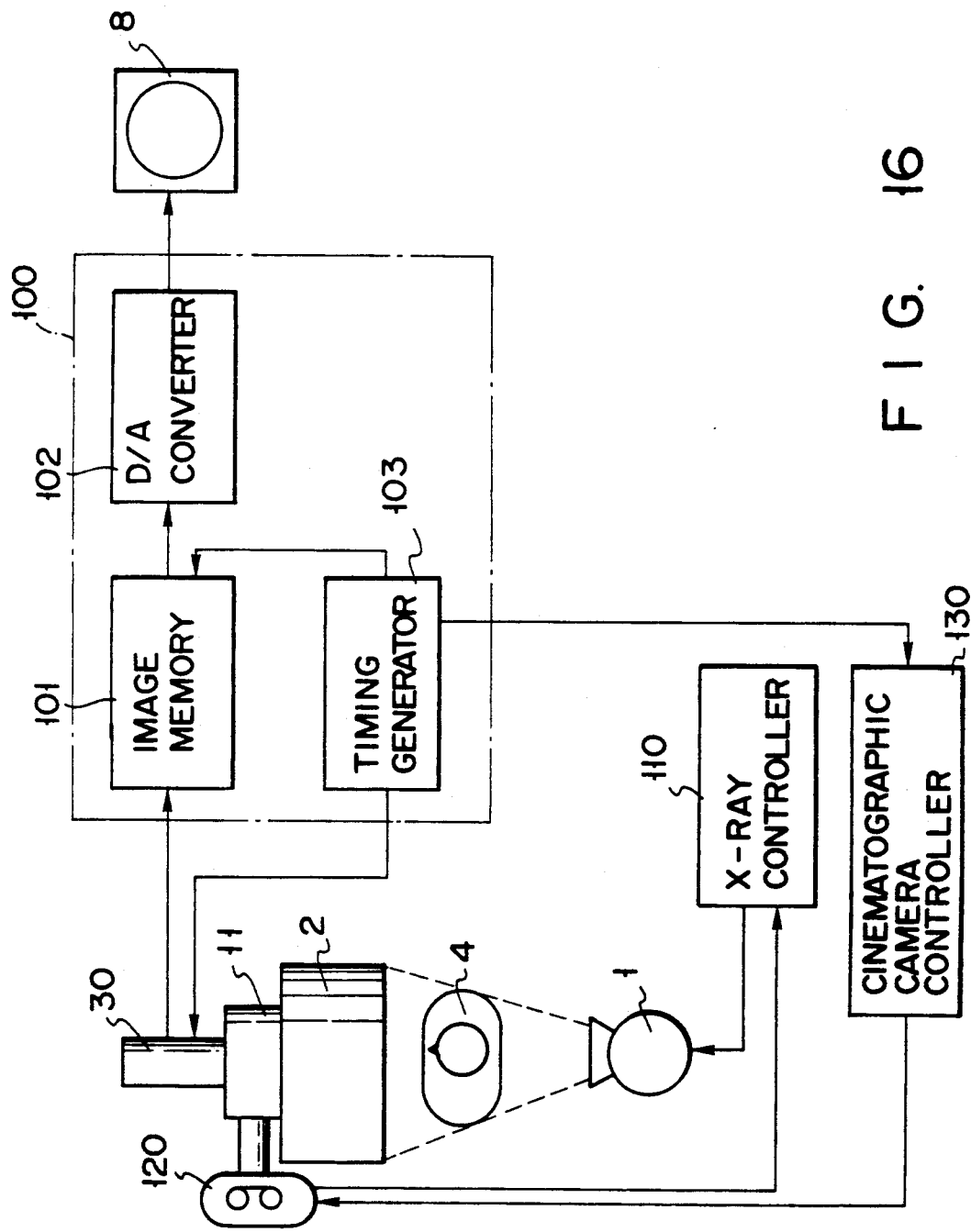
FIG. 16 is a block diagram showing an X-ray diagnosis apparatus according to a seventh embodiment of the invention.

An X-ray diagnosis apparatus according to a seventh embodiment of the invention will now be described with reference to FIG. 16. The apparatus according to the seventh embodiment is designed to simultaneously perform X-ray cine-fluorographic image pickup and TV image pickup. As is shown in FIG. 16, this embodiment employs TV camera 30 comprising a CCD image sensor-type image pickup device. The output from the TV camera 30 is displayed played on the monitor 8 via an image processing system 100. The image processing system 100 comprises an image memory 101, a D/A converter 102 and a timing generator 103. The timing generator 103 delivers shift pulses to the TV camera 30 and control signals to a cinefluorographic camera controller 130. The cinefluorographic camera controller 130 supplies a frame-feed control signal to a cine-fluorographic camera 120 attached to an optical system 11. The cinefluorographic camera 120 applies a shutter pulse, as an X-ray radiation timing signal, to an X-ray controller 110.

Figure 17:
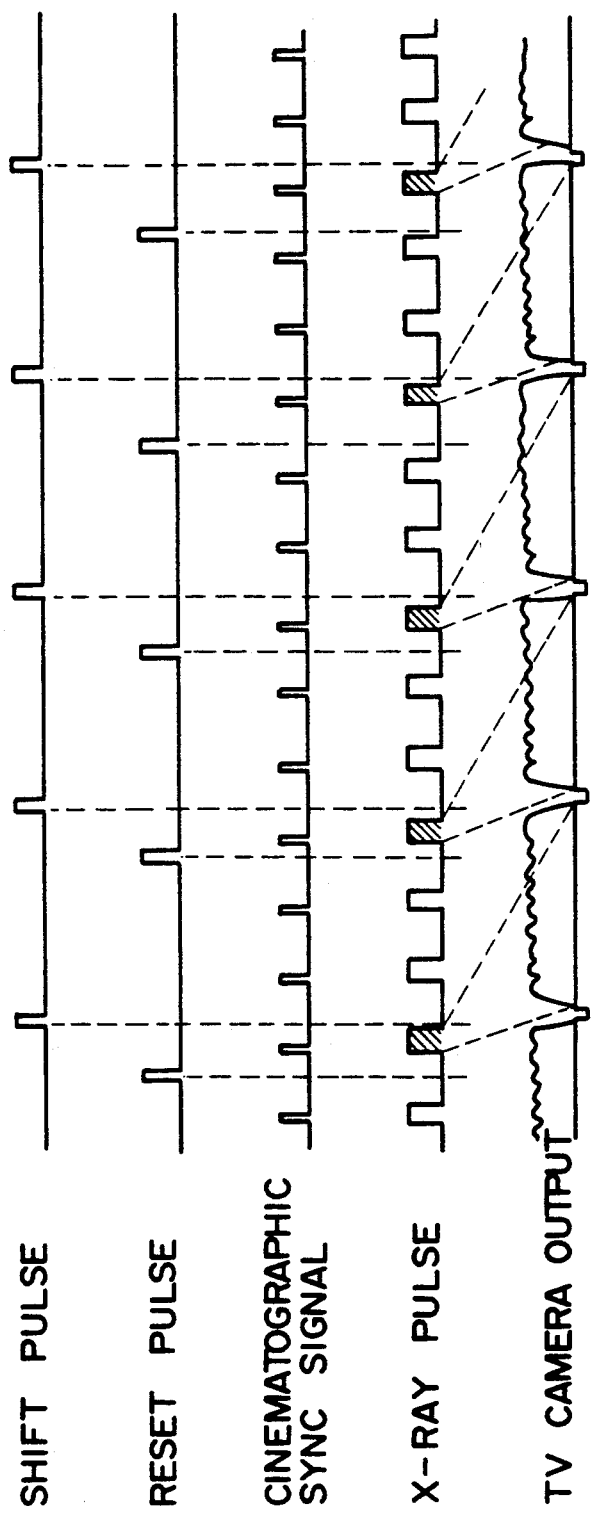
FIG. 17 is a timing chart for illustrating an example of the operation of the seventh embodiment.

The operation of the apparatus of FIG. 16 will now be described, referring to FIG. 17. The timing generator 103 supplies a cine-fluorographic sync signal to the cine-fluorographic camera controller 130. Thus, the camera controller 130 rotates the cine-fluorographic camera 120. The shutter pulse as the image-pickup timing signal is output from the camera 120 to the X-ray controller 130. The X-ray controller 130 applies a high voltage, which makes the X-ray radiation condition, to the X-ray tube 1. The high voltage is continued for the time corresponding to the X-ray pulse width.

X-rays radiated by the X-ray tube 1 pass through the object 4 and enter the I.I. 2. In the I.I. 2, an X-ray image is converted to an optical image. The optical image is guided through two paths in the optical system 11. The image is led to the cinefluorographic camera 120 through one of the paths, and it is recorded on a cinefluorographic film. On the other hand, the image is led to the TV camera 30 through the other path for TV image pickup. The timing generator 103 delivers reset pulses or shift pulses to the TV camera 30. The reset pulse is a control pulse for guiding an image on the accumulation layer of the CCD to the drain, and the shift pulse is a control signal for shifting the image on the accumulation layer to the transfer layer.

When the reset pulse is applied from the timing generator 103 to the TV camera 30, the shift pulse is applied from the timing generator 103, the non-effective X-ray image is let to flow to the drain, and only when the shift pulse is applied from the timing generator 103, the effective X-ray image is picked up from the TV camera 30 and stored in the image memory 101. The image stored in the image memory 101 is sequentially read out and converted to a video signal by the D/A converter 102. The video signal from the D/A converter 102 is displayed on the TV monitor 8.

The shift pulse delivered from the timing generator 103 is output at a time other than the time the effective image from the TV camera 30 is processed. The cinefluorographic sync signal is generated such that the X-ray pulse effective to the TV camera 30 is caused to rise, by the shift pulse, prior to the time corresponding to the X-ray pulse width and fall prior to the rise of the shift pulse, and other X-ray pulses are generated at the timing determined by equally dividing the remaining time. The reset pulse is output to the TV camera 30 prior to the rise of the effective X-ray pulse.

In this embodiment, only the X-ray image produced by those of the plural X-ray pulses radiated in the cine-fluorographic image pickup mode, which are effective for the TV camera 30, is obtained from the TV camera 30, thereby preventing a false image due to the plural X-ray pulse.

Figure 18:
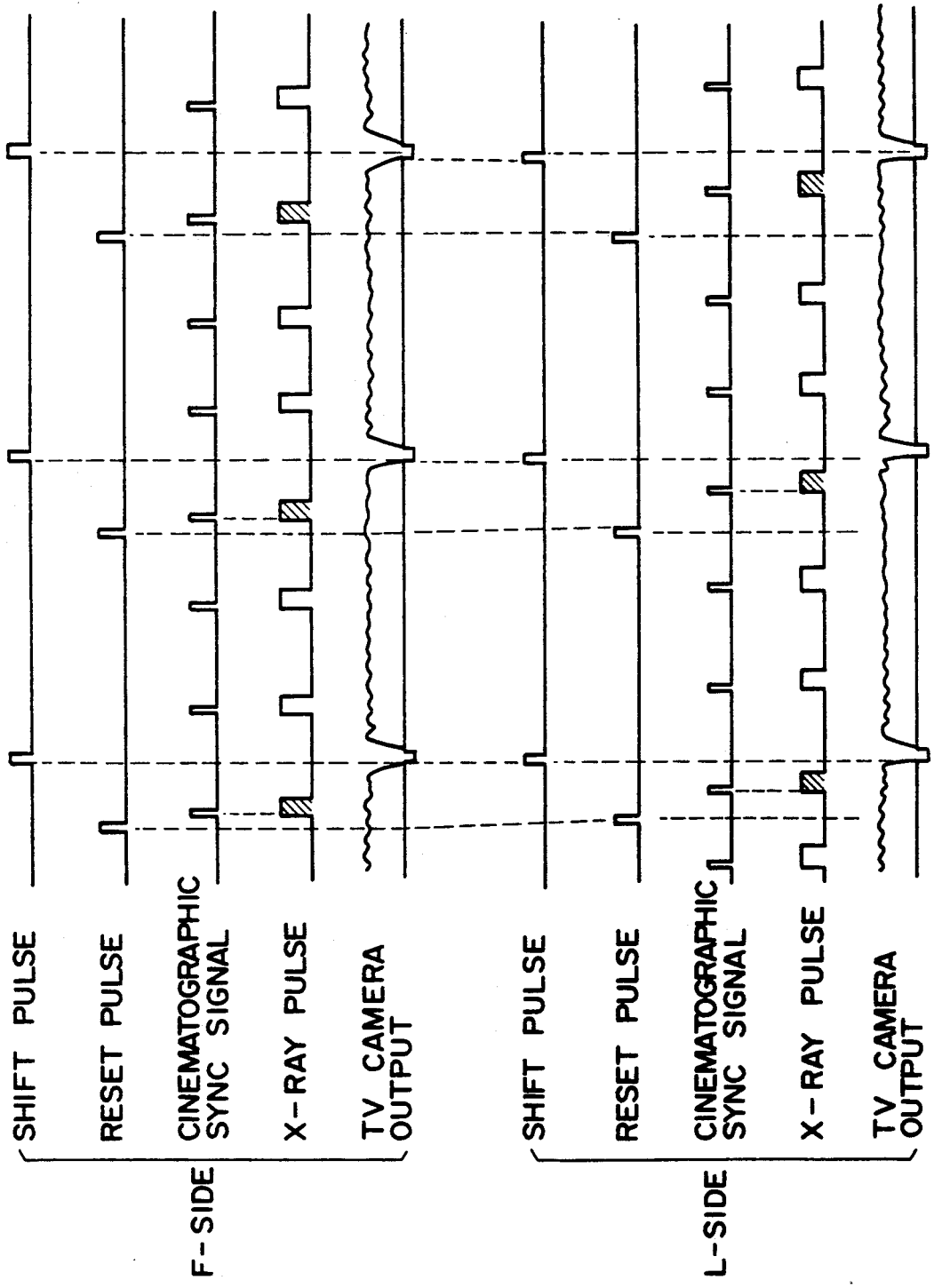
FIG. 18 is a timing chart for illustrating another example of the operation of the seventh embodiment.

FIG. 18 is a timing chart for illustrating the operation of the timing generator 103 in the mode of bi-plane cine-fluorographic image pickup and TV image pickup. In this case, the apparatus comprises two X-ray image pickup systems each having a cine-fluorographic camera and a TV camera. The X-ray image pickup systems are arranged on the f-side and l-side. This structure enables bi-plane image pickup to be performed. In other words, two sets of the apparatus shown in FIG. 16 are employed. Each TV camera comprises a CCD image sensor-type image pickup device.

The timing generator 103 applies the shift pulse at the time other than the time at which the image effective for the TV camera 30 is processed. The f-side cine-fluorographic sync pulse is determined such that the X-ray pulse effective for the TV camera 30 is caused to rise, by the shift pulse, prior to the time corresponding to sum of the f-side and l-side X-ray pulse widths, and other X-ray pulses are generated at the timing determined by equally dividing the remaining time. The l-side cine-fluorographic sync pulse is determined such that the X-ray pulse effective to the TV camera 30 is caused to rise, by the shift pulse, prior to the time corresponding to the l-side X-ray pulse width, and other X-ray pulses are generated at the timing determined by equally dividing the remaining time.

The reset pulses are delivered to the f-side and l-side TV cameras prior to the rise of the X-ray pulses effective for the TV cameras.

As has been described above, according to the seventh embodiment, when cine-fluorographic image pickup and TV image pickup are simultaneously performed, the cine-fluorographic image pickup can be performed at a speed higher than the read-out speed of the TV camera, and an image with a high time resolution can be obtained and a digital image free from a false image component can be obtained. Thus, high-accuracy image diagnosis can be carried out.

According to the present invention, therefore, bi-plane or single plane cine-fluorographic and TV image pickup can be performed and the obtained image can be processed by a single digital image processing system, whereby high-precision image diagnosis can be performed.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An X-ray diagnosis apparatus comprising:
    first and second X-ray image pickup means for converting X-rays, which have passed through an object, to optical images, thereby performing cine-fluorography with use of cine-fluorographic movie cameras and video imaging with use of TV cameras;
    an image processing system including a digital image processing means for subjecting TV images obtained by the first and second X-ray image pickup means to digital image processing;
    buffer means, provided between one of said X-ray image pickup means and the digital image processing means, for buffering images delivered from said one of the X-ray image pickup means to the digital image processing means; and
    display means for displaying images processed by said image processing system.

2. The apparatus according to claim 1, wherein said cine-fluorography is single-plane cinefluorography, which is performed in one direction with respect to the object, and/or bi-plane cinefluorography, which is performed in two directions with respect to the object.

3. The apparatus according to claim 1, wherein said digital image processing means comprises a digital fluorography apparatus.

4. The apparatus according to claim 1, wherein said buffer means operates to deliver and outputs from the first and second X-ray image pickup means to the digital image processing means in a time-divisional manner.

5. An X-ray diagnosis apparatus comprising:
    first and second X-ray generating means for radiating X-rays to an object in two directions;
    first and second X-ray detecting means for converting the X-rays, which have passed through the object, to optical images and video-imaging the optical images by means of TV cameras employing CCD image sensor-type image pickup devices;
    image processing means for subjecting TV images obtained by the first and second X-ray image pickup means to image processing;
    display means for displaying the images processed by the image processing means; and
    timing control means for controlling the timing at which X-rays are generated by the first and second X-ray generating means, and the timing at which shift pulses are delivered to the CCD image sensor-type image pickup devices in the first and second X-ray detecting means.

6. The apparatus according to claim 5, wherein said timing control means carries out timing control such that said first and second X-ray generating means radiate X-rays just before and after the shift pulses are delivered to the CCD image sensor-type image pickup devices in the first and second X-ray detecting means.

7. An X-ray diagnosis apparatus comprising: 964 first and second X-ray generating means including a stereo X-ray tube for radiating X-rays to an object in two directions;
    first and second X-ray detecting means for converting the X-rays, which have passed through the object, to optical images and video-imaging the optical images by means of TV cameras employing CCD image sensor-type image pickup devices;
    image processing means for subjecting TV images obtained by the first and second X-ray image pickup means to image processing;
    display means for displaying the images processed by the image processing means; and
    timing control means for controlling the timing at which L-side and R-side X-rays are generated by the stereo X-ray tube of the first and second X-ray generating means, and the timing at which shift pulses are delivered to the CCD image sensor-type image pickup devices in the first and second X-ray detecting means.

8. The apparatus according to claim 7, wherein said timing control means carries outtiming control such that said stereo X-ray tube of the first and second X-ray generating means radiate L-side and R-side X-rays just before and after the shift pulses are delivered to the CCD image sensor-type image pickup devices in the first and second X-ray detecting means.

9. An X-ray diagnosis apparatus comprising:

first and second X-ray generating means for radiating X-rays to an object in two directions;

first and second X-ray detecting means for converting X-rays, which have passed through the object, to optical images, thereby performing cinefluorography with use of cine-fluorographic movie cameras and video imaging with use of TV cameras comprising CCD image sensor-type image pickup devices;

image processing means for subjecting TV images obtained by the first and second X-ray detecting means to image processing;

display means for displaying images processed by said image processing means;

X-ray control means for controlling the timing at which said first and second X-ray generating means radiates X-rays and the timing at which shutter pulses are delivered to the cine-fluorographic movie camera of the first and second X-ray detecting means; and timing control means for controlling the timing at which the shutter pulses are delivered to the cine-fluorographic movie camera of the first and second X-ray detecting means, and the timing at which shift pulses are delivered to the CCD image sensor-type image pickup devices of the first and second X-ray detecting means.

10. An X-ray diagnosis apparatus comprising:

first and second X-ray generating means for radiating X-rays to an object in two directions;

first and second X-ray image pickup means for converting the X-rays, which have passed through the object, to optical images and video-imaging the optical images by means of TV cameras;

an image processing system including single image processing means for subjecting TV images obtained by the first and second X-ray image pickup means to image processing;

first and second buffer means arranged in parallel on transmission lines for connecting the first and second X-ray image pickup means to the image processing system, said buffer means buffering the images transmitted from the first and second X-ray image pickup means to the image processing system; and display means for displaying the images processed by the image processing system.

11. The apparatus according to claim 10, wherein said image processing system includes a statistical processing circuit for acquiring statistical information, based on which conditions for X-ray image pickup and X-ray radiation are calculated.

12. The apparatus according to claim 11, wherein said statistical processing circuit is controlled so as to receive image data alternately from the first and second buffer means.

13. The apparatus according to claim 10, wherein said image processing system includes digital image processing means and/or an image memory.

14. The apparatus according to claim 10, wherein said image processing system includes a statistical processing circuit for acquiring statistical information, based on which conditions for X-ray image pickup and X-ray radiation are calculated, digital image processing means, and/or an image memory.

15. An X-ray diagnosis apparatus comprising: first and second X-ray image pickup means for converting X-rays, which have passed through an object, to optical images and video-imaging the optical images by means of TV cameras;

an image processing system for subjecting TV images obtained by the first and second X-ray image pickup means to image processing;

first and second buffer means arranged, respectively, between the first X-ray image pickup means and the image processing means and between the second X-ray image pickup means and the image processing means, said buffer means buffering the images transmitted from the first and second X-ray image pickup means to the image processing system;

first and second statistical processing means, arranged in parallel to the first and second buffer means, for receiving images delivered from the first and second X-ray image pickup means; and display means for displaying the images processed by the image processing system.

16. The apparatus according to claim 15, wherein said image processing means has an image memory connected in parallel.

17. The apparatus according to claim 15, wherein said first and second statistical processing means are controlled so as to receive image data alternately from the first and second buffer means.

* * * * *